US009537606B2

(12) United States Patent
Mijarez Castro et al.

(10) Patent No.: US 9,537,606 B2
(45) Date of Patent: Jan. 3, 2017

(54) DOWN-HOLE INTELLIGENT COMMUNICATION SYSTEM BASED ON THE REAL-TIME CHARACTERISATION OF THE ATTENUATION OF SIGNALS IN A COAXIAL CABLE USED AS A TRANSMISSION MEDIUM

(71) Applicant: INSTITUTO DE INVESTIGACIONES ELECTRICAS, Cuernavaca, Morelos (MX)

(72) Inventors: Rito Mijarez Castro, Morelos (MX); David Pascacio Maldonado, Morelos (MX); Ricardo Guevara Gordillo, Morelos (MX); Joaquin Hector Rodriguez Rodriguez, Morelos (MX); Maria Jojutla Olimpia Pacheco Arteaga, Morelos (MX)

(73) Assignee: INSTITUTO DE INVESTIGACIONES ELECTRICAS, Cuernavaca, Morelos (MX)

( * ) Notice: Subject to any disclaimer, the term of this patent is extended or adjusted under 35 U.S.C. 154(b) by 0 days.

(21) Appl. No.: 14/442,631

(22) PCT Filed: Sep. 25, 2013

(86) PCT No.: PCT/MX2013/000112
§ 371 (c)(1),
(2) Date: May 13, 2015

(87) PCT Pub. No.: WO2014/077664
PCT Pub. Date: May 22, 2014

(65) Prior Publication Data
US 2015/0349918 A1 Dec. 3, 2015

(30) Foreign Application Priority Data

Nov. 14, 2012 (MX) .................... MX/a/2012/013691

(51) Int. Cl.
*H04B 3/46* (2015.01)
*H04B 17/00* (2015.01)
(Continued)

(52) U.S. Cl.
CPC ........... *H04L 1/0034* (2013.01); *E21B 47/122* (2013.01); *H04B 3/48* (2013.01); *H04B 3/54* (2013.01); *H04B 17/336* (2015.01); *H04L 1/206* (2013.01)

(58) Field of Classification Search
CPC ........ H04L 12/66; H04L 45/54; H04L 1/0034; H04L 1/206; H04W 40/22; G01V 11/002; E21B 43/11857; E21B 43/26; E21B 47/101; E21B 44/00; E21B 47/00; E21B 47/122; G01H 1/003; H04B 17/336; H04B 3/48; H04B 3/54
See application file for complete search history.

(56) References Cited

U.S. PATENT DOCUMENTS 4,042,824 A 8/1977 Pitts, Jr. et al.
4,107,644 A 8/1978 Howlett
(Continued)

FOREIGN PATENT DOCUMENTS

| GB | 1354244 | 5/1974 |
|---|---|---|
| WO | 2004070398 A2 | 8/2004 |
| WO | 2012066323 A2 | 5/2012 |

OTHER PUBLICATIONS

International Search Report dated Feb. 28, 2014 for PCT/MX2013/000112 and English translation.

*Primary Examiner* — Freshteh N Aghdam
(74) *Attorney, Agent, or Firm* — Lucas & Mercanti, LLP

(57) ABSTRACT

The invention comprises real-time down-hole intelligent communication based on the characterization of signal attenuation caused by a coaxial cable used as a communication medium and by frequency response changes of the electronic components of the transmitters and receivers, generated by the down-hole operating environment. The invention relates to a method for the real-time characterization of the attenuation response of a two-way communication system using a coaxial cable, consisting in: generating test tones for the real-time characterization of the attenuation response of a two-way communication system in the transmission and reception bands, measuring the signals received, estimating noise and the ratio to the communication signal, comparing with reference responses, adjusting the transmission and reception frequencies in order to maintain the communication with the maximum signal-to-noise ratio. The invention also relates to an adaptive two-way (Continued)

transmitter/receiver system for communication using coaxial cable as a link means, formed by: a transmitter with automatic adjustment of the operating band by means of the real-time characterization of the attenuation response of a two-way communication system. The invention further relates to adjustable filtering and coupling devices for optimizing the transmission and reception bands, and a control module capable of measuring the transmission and reception attenuation responses.

4 Claims, 9 Drawing Sheets

(51) Int. Cl.
*H04Q 1/20* (2006.01)
*H04L 1/00* (2006.01)
*H04L 1/20* (2006.01)
*H04B 3/54* (2006.01)
*H04B 17/336* (2015.01)
*H04B 3/48* (2015.01)
*E21B 47/12* (2012.01)

(56) References Cited

U.S. PATENT DOCUMENTS

| | | | |
|---|---|---|---|
| 4,355,310 A | 10/1982 | Belaigues et al. | |
| 4,415,895 A | 11/1983 | Flagg | |
| 5,838,727 A | 11/1998 | Lyon et al. | |
| 6,580,751 B1* | 6/2003 | Gardner | G01V 1/22 375/222 |
| 7,975,392 B1 | 7/2011 | Spaulding | |
| 2003/0149991 A1 | 8/2003 | Reidhead et al. | |
| 2004/0222901 A1* | 11/2004 | Dodge | G01V 11/002 340/854.3 |
| 2006/0182014 A1 | 8/2006 | Lusky et al. | |
| 2007/0242563 A1* | 10/2007 | Kamata | G01V 13/00 367/38 |
| 2008/0316048 A1* | 12/2008 | Abdallah | G01V 11/002 340/854.6 |
| 2009/0326826 A1* | 12/2009 | Hull | E21B 47/123 702/8 |
| 2010/0052940 A1 | 3/2010 | Hesbol et al. | |
| 2010/0171639 A1* | 7/2010 | Clark | E21B 47/12 340/856.3 |

\* cited by examiner

DOWN-HOLE INTELLIGENT COMMUNICATION SYSTEM BASED ON THE REAL-TIME CHARACTERISATION OF THE ATTENUATION OF SIGNALS IN A COAXIAL CABLE USED AS A TRANSMISSION MEDIUM

CROSS REFERENCE TO RELATED APPLICATION

This Application is a 371 of PCT/MX2013/000112 filed on Sep. 25, 2013 which, in turn, claimed the priority of Mexican Patent Application No. MX/a/2012/013691 filed on Nov. 14, 2012, both applications are incorporated herein by reference.

SCOPE OF THE INVENTION AND BACKGROUND

Down-hole measurement of thermodynamic and geophysical parameters, increasingly deep and hot, of oil reserves is a cardinal factor for proper extraction. Measurement of these parameters is performed using tools that are designed specifically to endure the adverse environments of these applications. Some important parameters provided by these tools are temperature, pressure, flow rate, and vibrations, among others. The records of these parameters are useful for the characterization of reserves, since these tools are in direct contact with the formation thereof.

The depth of oil wells increases gradually and nowadays, in some cases, it exceeds 7000 m. Consequently, at those depths it is possible to obtain high-temperature and high-pressure conditions. Temperatures may exceed 200° C. and pressures may exceed 20,000 psi. It is considered high temperature above 150° C. and high pressure above 10 000 psi.

The measurement and recording of the characteristics of oil reserves has driven the design and implementation of measuring tools with specialized electronics and innovative communications systems. The challenges of communication systems, in these hostile environments, which lead to obtaining very poor signal-to-noise ratios (SNR), include noise interference, cable attenuation, and thermal drift of passive electronic components, among others.

The state of practice is integrated by technologies that use cable connections for communications and power transmission. Various communication techniques have been described, for example:

U.S. Pat. No. 4,107,644 describes a system and method to digitally transmit down-hole measurement information; signal transmission via cable is performed on baseband (without modulation) by means of a synchronization system with phase encoding. However, the intelligent communication system presented here does not have the electronic circuits or the method for real-time characterization of the attenuation response of a bidirectional communications system using coaxial cable as linking medium, adjustment of transmission and reception frequencies to maintain communication with the maximum signal-to-noise ratio, and comparison with reference attenuation responses.

U.S. Pat. No. 4,355,310 describes a communications system for down-hole data capture that uses bidirectional communication with universal interconnection and addressing, which recognizes the control instruction from devices based on that addressing. However, unlike the intelligent communication system presented herein, this patent does not have the electronic circuits or the method for real-time characterization of the attenuation response of a bidirectional communications system using coaxial cable as linking medium, adjustment of transmission and reception frequencies to maintain communication with the maximum signal-to-noise ratio, and comparison with reference attenuation responses.

U.S. Pat. No. 4,415,895 describes a data transmission system that uses bidirectional transmission-reception by means of modulation by PCM-pulse encoding. However, this patent does not consider the electronic circuits or the Method for real-time characterization of the attenuation response of a bidirectional communications system using coaxial cable as linking medium, adjustment of transmission and reception frequencies to maintain communication with the maximum signal-to-noise ratio, and comparison with reference attenuation responses.

U.S. Pat. No. 5,838,727 describes a device and a method to transmit and receive digital data over a bandpass channel. It comprises a method and a device for transmission and reception combining amplitude modulation with QAM-phase modulation. However, this patent does not consider the electronic circuits or the method for real-time characterization of the attenuation response of a bidirectional communications system using coaxial cable as linking medium, adjustment of transmission and reception frequencies to maintain communication with the maximum signal-to-noise ratio, and comparison with reference attenuation responses.

Patent US 2010/0052940 uses switched power line communication at frequencies greater than 400 kHz, and the transmission of communication signals is sent at low frequency, which causes switched power transmission not to interfere with communication. However, unlike the intelligent communication system presented herein, this patent does not have the electronic circuits or the method for real-time characterization of the attenuation response of a bidirectional communications system using coaxial cable as linking medium, adjustment of transmission and reception frequencies to maintain communication with the maximum signal-to-noise ratio, and comparison with reference attenuation responses.

The aforementioned patents do not consider adaptive bidirectional transmission-reception equipment for communication using coaxial cable as linking medium, with a transmitter having operating-band automatic adjustment based on real-time frequency response of the communication link and the assessment of the signal-to-noise ratio for data transmission, the use of adjustable coupling and filtering devices for transmission and reception bands, a control module capable of measuring attenuation responses in transmission and reception to determine operating frequencies, and an intelligent receiver with operating-band automatic adjustment capability that best fits to modulation techniques in data transmission and reception.

In addition, the aforementioned patents do not deal with a method for real-time characterization of the attenuation response of a bidirectional communications system using coaxial cable as linking medium, by the generation of sweep signals by test tones or time-domain narrow pulse signals with known wide spectrum to characterize bands of interest covering transmission and reception bands, processing and measurement of received signals, comparison with reference responses, adjustment of transmission and reception frequencies to maintain communication with the maximum signal-to-noise ratio.

SUMMARY OF THE INVENTION

The purpose of this invention is a down-hole, real-time, intelligent communications system based on the characterization of signal attenuation in a communication link whose features are affected by temperature variations in the communication medium, which consists of a coaxial cable as linking medium and electronic modules that perform the transmission and reception functions.

The method for real-time characterization of the attenuation response of a bidirectional communication system using coaxial cable as linking medium, consists of: the measurement of the real-time frequency response of the communication link and the assessment of the signal-to-noise ratio for data transmission, the use of adjustable coupling and filtering devices of the transmission and reception bands, a control module capable of measuring the attenuation responses in transmission and reception and of determining the operating frequencies, and an intelligent receiver with operating-band automatic adjustment capability that best fits to the modulation technique in data transmission and reception.

It is, also, the purpose of this invention the development of the method and the implementation of the electronic circuit, for: Down-hole, real-time, intelligent communication based on the characterization of the signal attenuation caused by a mono-conductor cable and electronic modules that perform the transmission and reception functions.

DETAILED DESCRIPTION OF THE INVENTION

The method for real-time characterization of the attenuation response of a bidirectional communications system using a coaxial cable as linking medium is described below.

Figure 1:
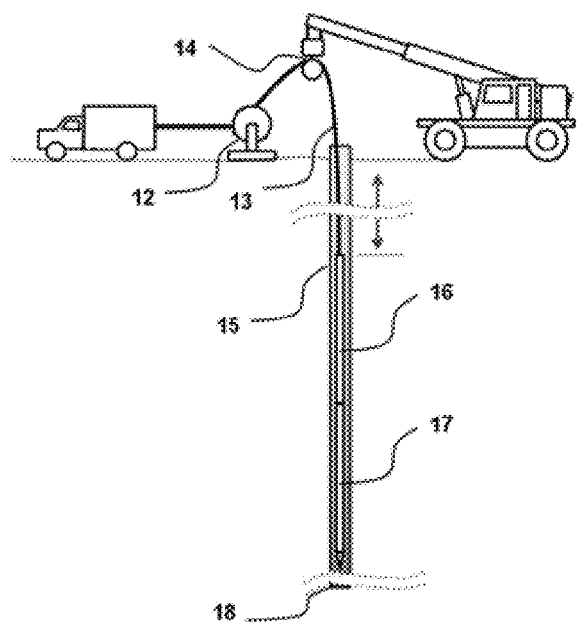
FIG. 1 is a diagram of the entire system for temperature and pressure measurement in oil wells. Where 11 is a mobile unit, 13 is a cable, 16 is a measuring device, 17 is a tractor equipment, 18 is the down hole, 12 is a spinning reel, 14 is a mechanical crane jib, and 15 is the wellhead.

FIG. 1 shows the diagram of the entire system for temperature and pressure measurement in oil wells; it consists of a mobile unit 11 to house the measurement, control, power supply, and communications equipment, which is connected to and communicated by means of a cable 13 with the measuring equipment 16, which in turn is connected to the tractor equipment 17 that descends to the down hole 18, the cable is gradually released by a spinning reel 12 and assisted by the mechanical crane jib 14 to make the transition from the horizontal outlet of the reel to the vertical inlet into the well 15.

Figure 2:
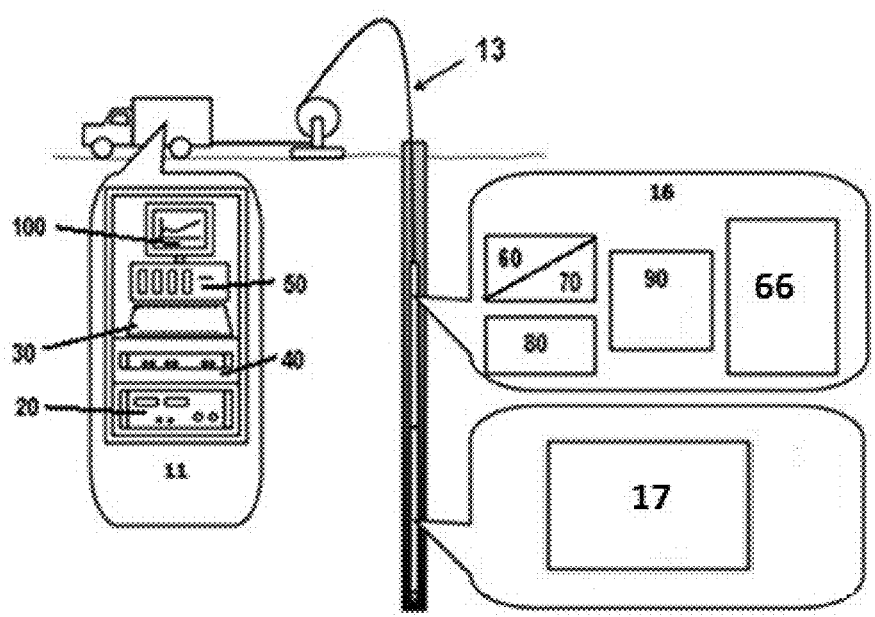
FIG. 2 is a close-up to the temperature and pressure measuring system. Where 11 is a mobile unit, 100 is a computer, 50 is an acquisition and control module, 40 is a PLC (power-line communication) transmitter module, 30 is a PLC receiver, 20 is a power source, 16 is a measurement module, 66 is a sensing module, 90 is a processing unit, 70 is a transmitter, 60 is a receiver, 80 is a power supply, 17 is a tractor module.

FIG. 2 shows a close-up to the measuring system for temperature and pressure, and other physical parameters, where it is shown that inside the mobile unit 11 the following are indicated as outstanding elements: a computer 100, connected to an acquisition and control module 50, to a PLC-transmitting module 40 (power-line communication), to a PLC receiver 30, which is connected to a power source 20, where the PLC-transmission 40 and PLC-reception 30 modules and the source 20 connect to the cable by means of a coupling unit to cable 13, which in turn connects to the measurement module 16, comprised by a sensing module 66, a processing unit 90, a transmitter 70 and a receiver 60, the measurement module 16 connects and communicates to the tractor module 17 by means of an RS-485 transceiver (recommended standard transceiver) 125.

Figure 3:
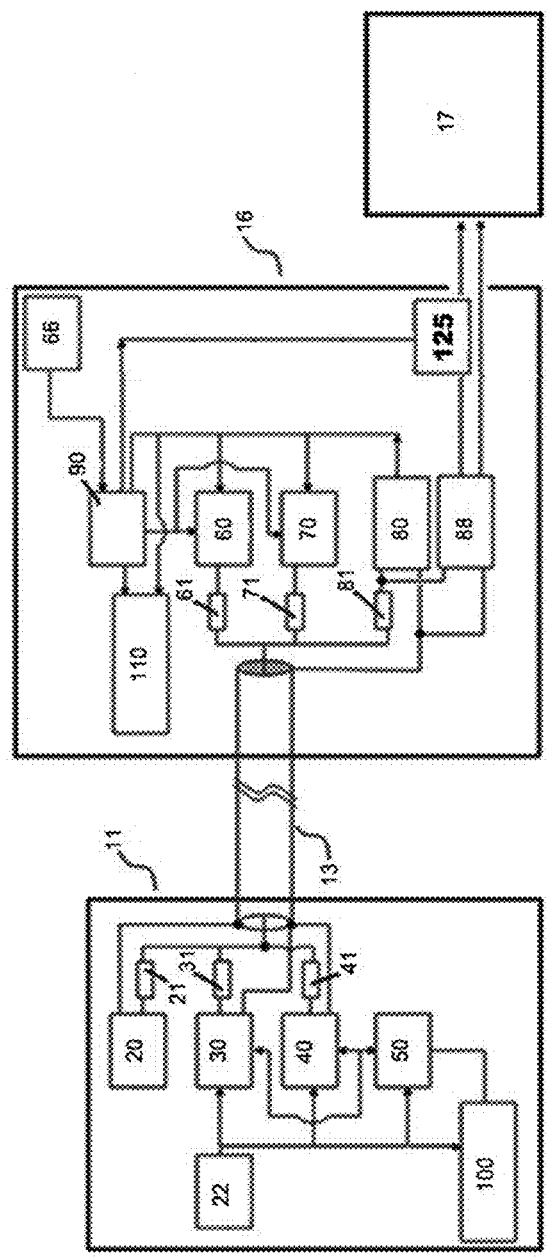
FIG. 3 shows the functional block diagram of the intelligent communication system. Where 11 is a surface measurement module, 16 is a well measurement system, 17 is a tractor equipment, 13 is a coaxial cable, 20 is a high-voltage power supply, 22 is a power line source, 80 is a down-hole high-voltage reducing source and 88 is a down-hole high-voltage and high-power reducing source, 30 is a PLC receiver, 40 is a PLC transmitter module, 50 is an acquisition and control module, 100 is a computer, 21, 31, and 41 are filtering modules, 110 is a storage module, 90 is a processing unit, 66 is a sensing module, 61, 71, and 81 are filtering modules, 60 is a receiver, 70 is a transmitter, and 125 is an RS-485 transceiver module.

FIG. 3 shows the block functional diagram of the intelligent communication system, which can be divided into the surface measurement module 11 and the down-hole measurement module 16, where both modules 11 and 16 are interconnected by cable 13. The surface module consists of a power source 22 that supplies power to modules 30, 40, 50, and 100 that are part of 11, and a source 20 to provide the energy needed in the down hole module 16, by means of cable 13, and feeds the voltage-conditioning module, source 80, which supplies power to modules 70, 60, 90 and 110, the source module 20 also feeds the voltage-conditioning module, source 88 to energize the tractor module 17. The operation of the intelligent communication system consists of the transmitter Ts 30 and receiver Rs 40 on the surface linked by cable 13 with receiver Rf 60 and Tf 70 down hole. Conditioning required to maintain the signal levels both in transmission and in reception is performed by the filtering modules 21, 31, 41 of the surface end and modules 61, 71, and 81 on the down hole end, and their role is the following: when transmitter 30 sends a signal at the frequency Ts, receiver 60 must receive it with minimum attenuation and receiver 40 must receive the minimum signal (maximum attenuation) for not interfering with the communication channel between the transmitter 70 and the receiver 40. Power sources without conditioning show very low impedance for communication signals, and therefore it is required to insert locking traps to ensure low attenuation of transmission and reception signals in both ways of the bidirectional communication link between 30 and 60 and between 70 and 40, for this modules 21 and 81 show high impedance in communication frequencies.

Figure 4:
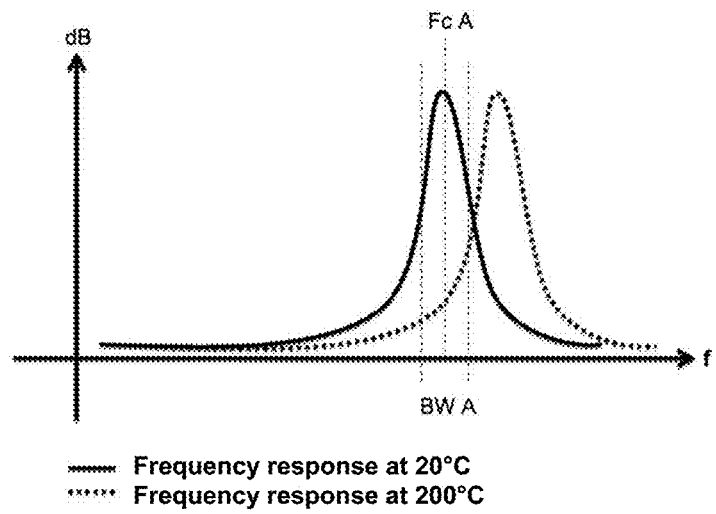
FIG. 4 Locking trap frequency response. Where Fc A is the central frequency of the transmission carrier signal from surface to down hole and BW A is the bandwidth of such signal. The solid line indicates the frequency response of the filter at 20° C. and the dotted line represents the frequency response of the filter at 200° C. The y-axis indicates the magnitude in decibels and the x-axis represents the frequency in Hertz.
Figure 5:
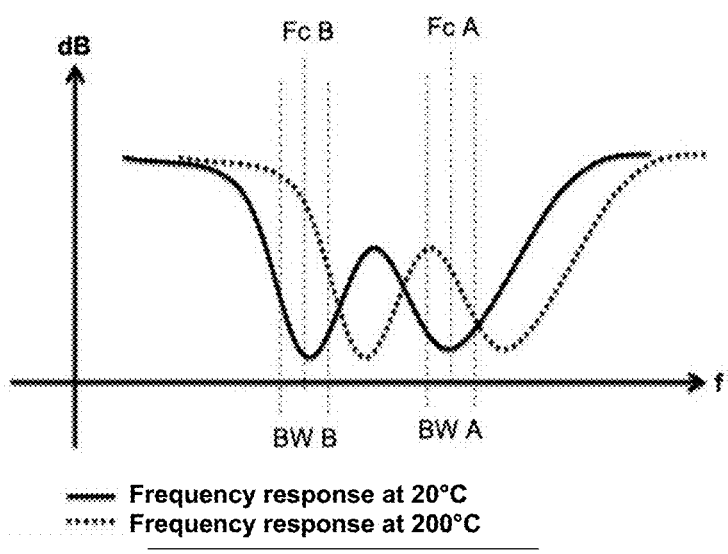
FIG. 5 Frequency response of band rejection filters in transmission and reception. Where Fc A is the central frequency of the transmission carrier signal from surface to down hole, BW A is the bandwidth of such signal, Fc B is the central frequency of the transmission carrier signal from down hole to surface, BW B is the bandwidth of such signal. The solid line indicates the frequency response of the filter at 20° C. and the dotted line represents the frequency response of the filter at 200° C. The y-axis indicates the magnitude in decibels and the x-axis represents the frequency in Hertz.

FIG. 4 shows an example of the frequency response of 31, 41, 61, and 71, FIG. 5 shows the response of 21 and 81. The shift of the frequency response shown in FIG. 4 is representative of the behavior of the frequency responses of modules 61 and 71, when subjected to different temperatures. Where the solid line represents the filter operation at room temperature with FcA as its central frequency and BWA as its bandwidth; on the other hand, the dotted line corresponds to the shift caused by thermal drift. Also, the shift of the frequency response shown in FIG. 5 is representative of the behavior of the frequency responses of module 21, when subjected to different temperatures. In both cases, the shift occurs when the operating temperature changes within the range of 20 to 200 degrees Celsius. Follow-up of these changes, automatically, is part of the intelligent communication that is the purpose of this patent.

Figure 6:
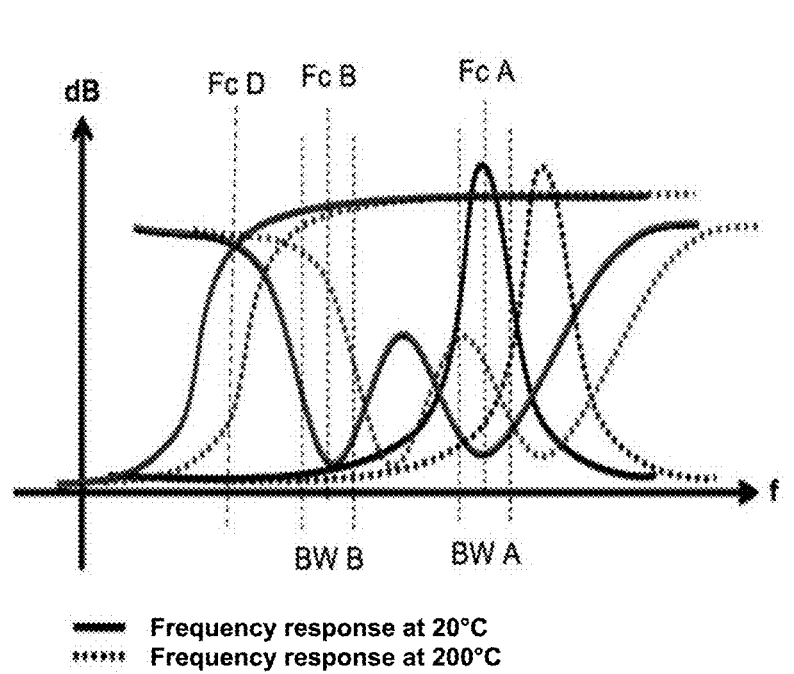
FIG. 6 Overexposure of frequency responses of coupling filters in transmission and reception, as well as the frequency response of a high-pass filter contained in the filtering modules.

FIG. 6 illustrates the overlapping of frequency responses of the filtering modules described in FIGS. 4 and 5 at the transmission FcA and reception FcB frequencies with BWA and BWB bandwidths, respectively.

The acquisition and control module 50 performs characterization procedures of modules 20, 30, and 40, defines the power and frequency of transmission for the transmitter 30, and defines the sensitivity for the receiver 40, encodes the communication messages and decides about the operating central frequency to be used; it also controls the display and storage of information in the computer 100. The processing unit 90 performs characterization procedures of modules 60, 70, and 80, defines the power and frequency of transmission for the transmitter 70, and defines the sensitivity for the receiver 60, encodes the communication messages and in coordination with 50, adjusts the operating frequencies for transmission and reception, it detects and scales the measurement signals of the sensing module 66. Module 90, down hole, controls information storage in the storage module 110; likewise, module 50, on surface, controls information storage in module 100. The communications scheme in based on sending commands in the form of messages from the surface module 11 to the down hole module 16, which executes the instructions and sends a response message to the surface module 11. Command messages may contain execution requests from a set of functions comprising information requests related to the measurement of pressure and temperature variables, the execution of movement of the tractor 17, modification of operating parameters, and synchronization of the characterization procedure of the communication medium.

Figure 7:
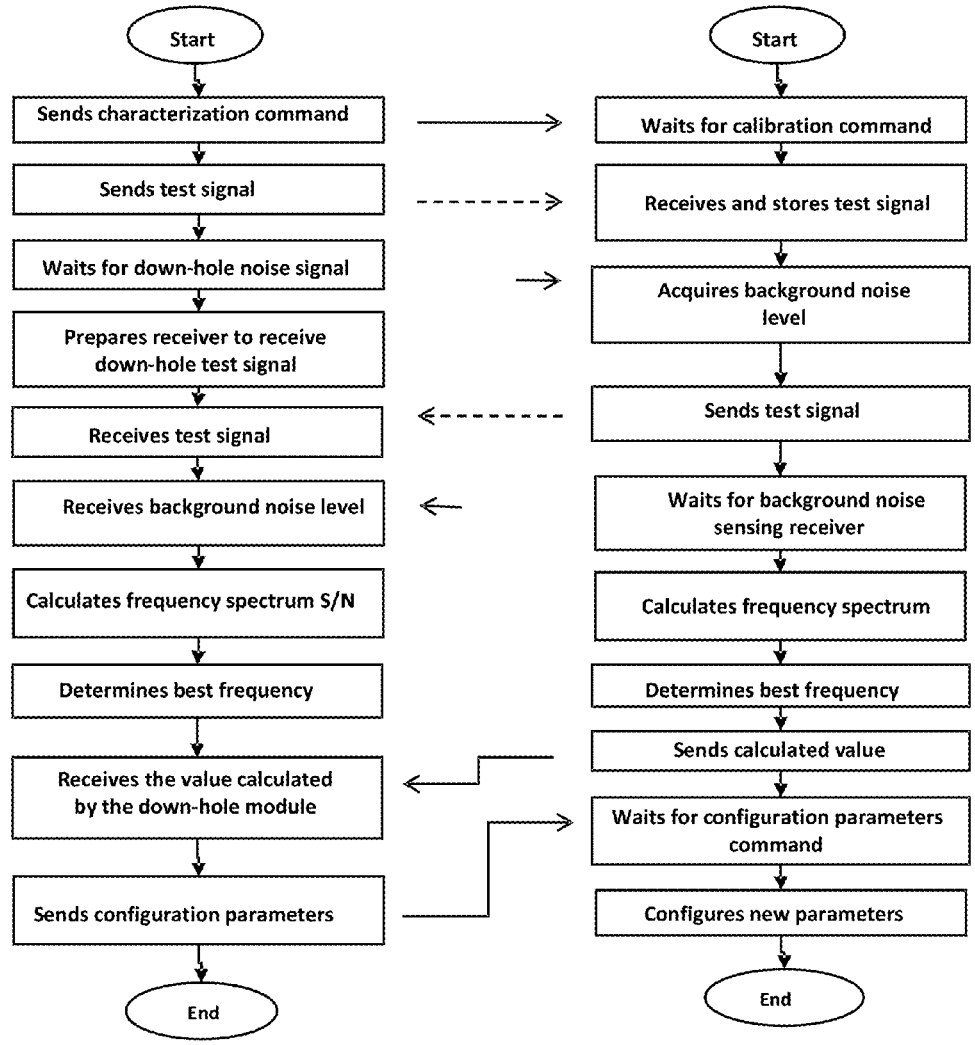
FIG. 7 Flow chart of the intelligent communication method.
Figure 8:
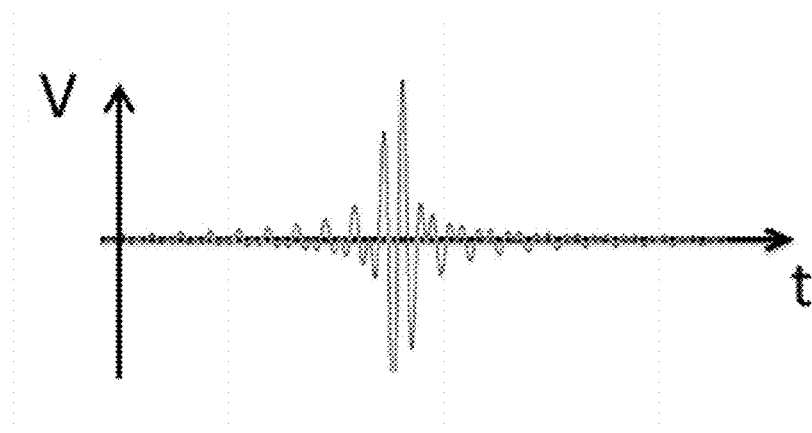
FIG. 8 Example of time-domain test signal.
Figure 9:
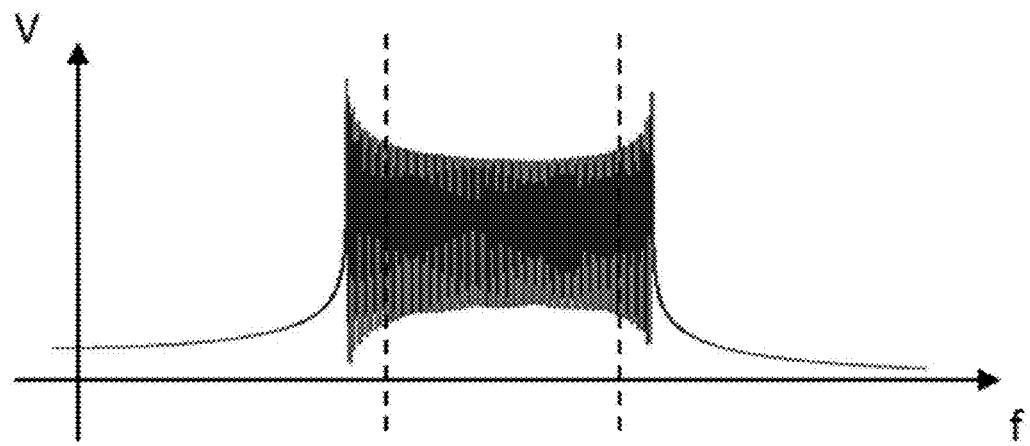
FIG. 9 Example of signal response for frequency-domain test.

The preferred method for real-time characterization of the communication medium is presented with the flow chart of FIG. 7; the method starts with the delivery of a message that contains a characterization instruction or command of the communication medium from the surface module 11 to the down hole module 16, which prepares its control module 90 to capture the wide-spectrum test signal, which is sent by the surface module 11. The test signal that travels through the entire communication medium from the surface module 11 to the down hole module 16, is acquired and stored for further processing by the control module 90 of the down hole module 16. Then the surface module 11 stops the transmission of the wide-spectrum test signal to give the opportunity to the down hole module 16 to capture the floor noise signal that is present, which is also stored for further processing.

In the following step, the surface module 11 prepares its acquisition and control module 50 to capture the wide-spectrum test signal that will be sent from the down hole module 16. The down-hole module 16 sends the test signal, which travels through the entire communications medium from the down hole, to the surface. The received signal is stored for further processing by the acquisition and control module 50. Then, the down-hole module 16 stops sending the wide-spectrum test signal for the surface module 11 to be able to capture the background noise signal and also store it for further processing.

In the following step the surface 11 and down-hole 16 modules perform the processing of the signals that were captured in real time by means of their acquisition and control modules 50 and 90, respectively. Processing involves obtaining the Fast Fourier Transform (FFT) of the wide-spectrum and floor noise test signals. Each one generates as a result a data vector that indicates the magnitude of the signals as a function of their frequency. Both data vectors obtained by the control module 90 of the down-hole module 16 are analyzed to find the frequency of reception with the best signal-to-noise ratio, which is sent to the surface module 11 as a response message.

The surface module 11 performs the same procedure using the data vectors obtained by its control module 50 to determine the frequency of transmission with the best signal-to-noise ratio from the down-hole module 16 to the surface module 11.

As a next step, the surface module 11 sends a message with a communication parameter re-configuration instruction or command to the down-hole module 11. This message tells the down-hole module the new transmission and reception frequencies to be used. Then the control module 90 of the down hole module 16 re-assigns the values of the coefficients associated to the digital filtering block of FIG. 12. Additionally, values are assigned to the demodulation parameters of FIG. 13 and to the modulation parameters of FIG. 15 of the new frequencies indicated in the message from the surface module 11. While carrying out this task, the down-hole module 16 sends a response message to the surface module 11 that confirms the change in parameters of the communication blocks of FIGS. 12, 13, and 15.

On the other hand, the surface module 11, through its acquisition and control module 50, adjusts its digital filter blocks from FIG. 17, its demodulating block from FIG. 18, and its modulating block from FIG. 20 to the new frequencies.

The preferred method for real-time characterization of the communication medium shown in FIG. 7, is not limited and may be considered a complement while keeping a record of the adjustment of transmission and reception parameters as a function of frequency and temperature, so that the beginning of operation of the communications system may have as alternatives the startup with parameters at room temperature, last parameters used in measurement, or automatic adjustment according to a table of parameters stored in previous measurement or calibration runs.

Figure 10:
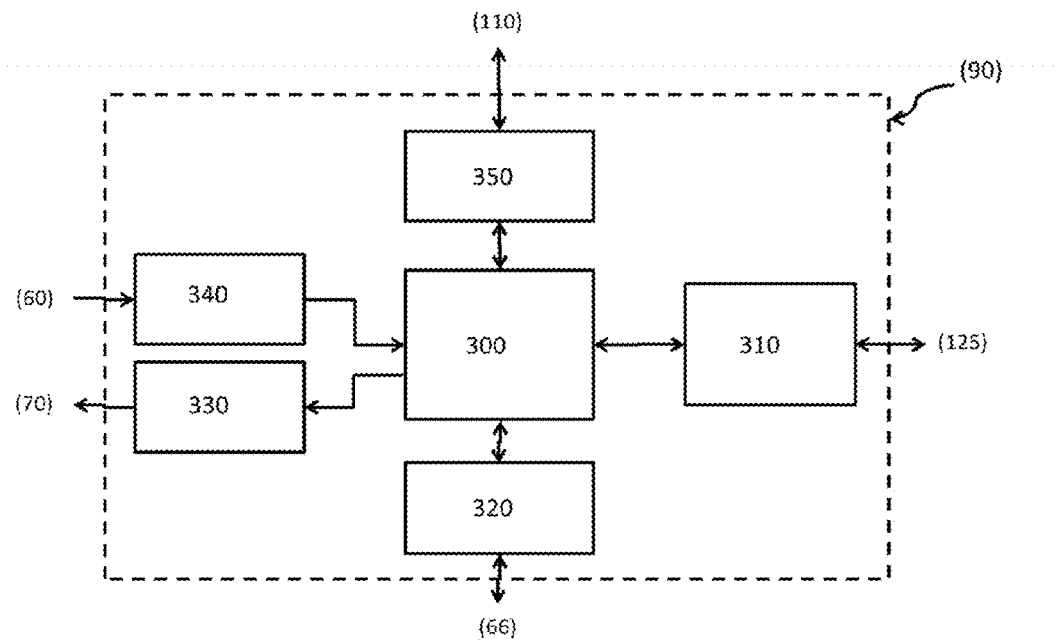
FIG. 10 Down-hole control and processing block. Where 90 is the down-hole control and processing block, 340 is the PLC-receiving digital block, 330 is the PLC-transmitting digital block, 350 is the storage digital block, 300 is the core processing digital block, 320 is the measurement digital block, and 310 is the UART transceiver digital block.

The control and processing block 90, shown in FIG. 10, is composed of the PLC-receiving digital block 340, the PLC-transmitting digital block 330, the measurement digital block 320, the storage digital block 350, the UART (Universal asynchronous transceiver) transceiver digital block 310, and the central processing digital block 300. The analog signal coming from the receiving module 60 is shown at the input of the PLC-receiving digital block, which is connected to the central processing digital block to process the command messages coming from the surface module 11. The central processing digital block 300 connects to the measurement digital block 320 to capture the physical parameters of the measurement block 66, it is connected to the UART transceiver digital block 310 to transmit commands and receive responses from the tractor 17 by means of the RS-485 module 125. It is also connected to a PLC-transmitting digital block to communicate the results to the surface module.

Figure 11:
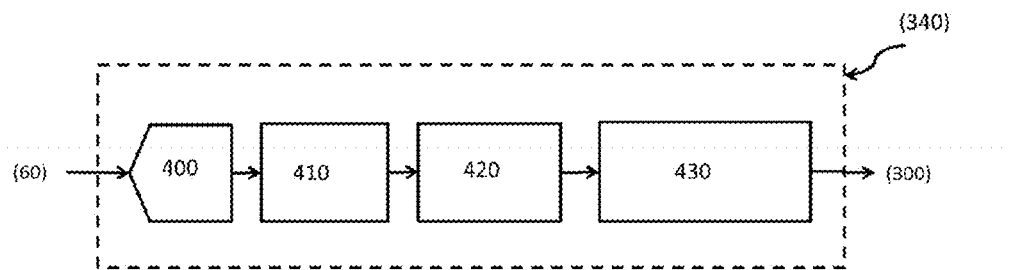
FIG. 11 PLC-receiving digital block. Where 340 is the PLC-receiving digital block, 400 is an analogue-to-digital converter (ADC), 410 is a digital filter block, 420 is a demodulator block, and 430 is a data link and message detection block.

The PLC-receiving digital block from FIG. 11 is composed of an analogue-to-digital converter (ADC) 400, a digital filter block 410, a demodulating block 420, a data link and message detection block 430. The ADC 400 receives the analog signal coming from the PLC-receiving module 60, the ADC 400 converts such analog signal to a digital representation, which is the input to the digital filter block 410 that limits the band to the reception frequency spectrum, the output of the digital filter is connected to a demodulating block 420, which retrieves the digital frame of the command messages, where the digital frame is sent to the data link and message detection block 430 that sends the retrieved information to the central processing digital block 300.

Figure 12:
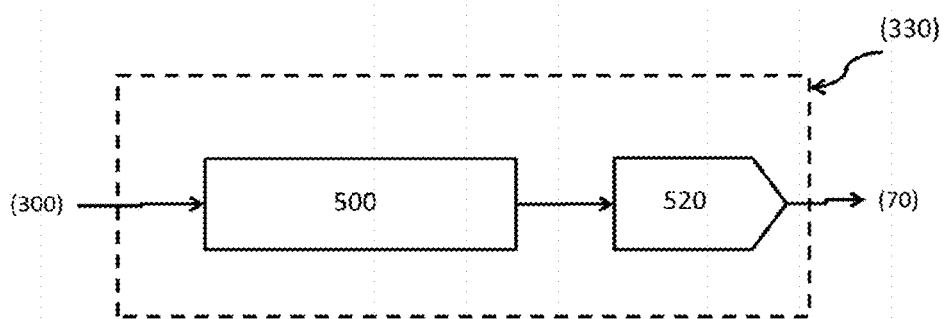
FIG. 12 PLC-transmitting digital block. Where 330 is the PLC-transmitting digital block, 500 is a message building and segmentation block, and 520 is a signal synthesizer block.

The PLC-transmitting digital block from FIG. 12 is composed of a message-building and segmentation block 500 and a synthesizing block (DAC) 520. The message-building and data segmentation block 500 receives the information coming from the central processing digital block 300, encodes and segments the message, whose segments are delivered to the signal-synthesizing module 520, which delivers a transmission-band modulated analog signal to the transmitting module 70.

Figure 13:
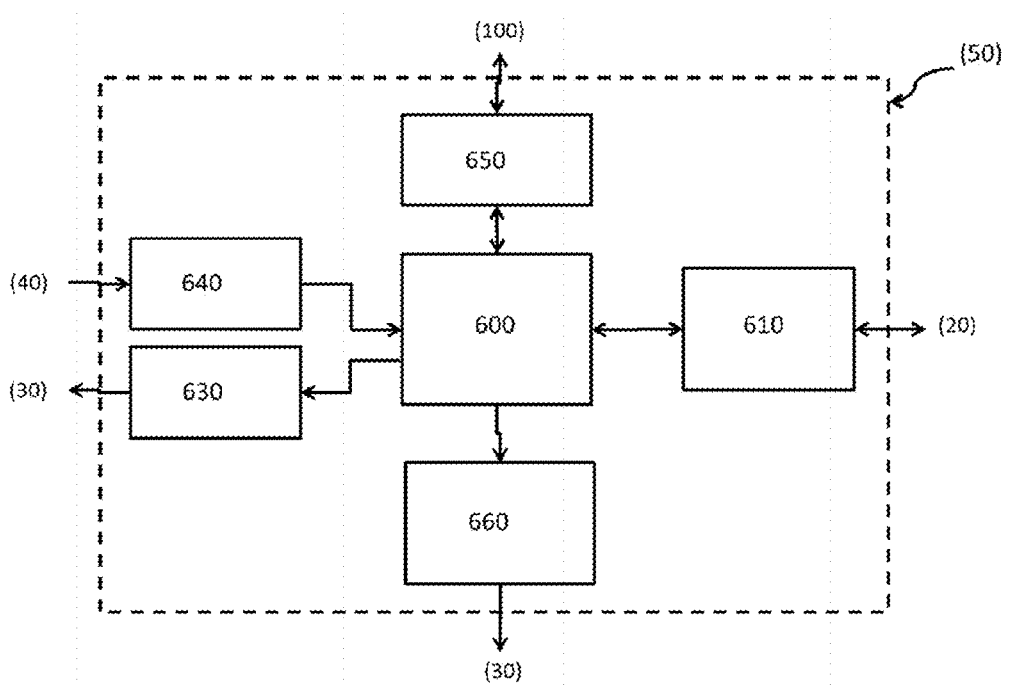
FIG. 13 Acquisition and control module. Where 50 is the acquisition and control module, 650 is a digital storage block, 640 is a PLC-receiving digital block, 630 is a PLC-transmitting digital block, 660 is a PLC-receiving filter digital control block, 600 is a core processing digital block, and 610 is a power supply digital control block.

The acquisition and control module 50, shown in FIG. 13, is composed of the PLC-receiving digital block 640, the PLC-transmitting digital block 630, the display and storage digital block 650, the PLC-receiver filter control digital block 660, and the central processing digital block 600. The analog signal coming from the receiving module 40 is present at the input of the PLC-receiving digital block 640, which is connected to the control and processing block 600 to process response messages from the down hole module 16. The control and processing block 600 is connected to the display and storage block 650 to display and store the physical parameters measured by the down-hole module 16. Also, it is connected to a PLC-transmitting digital block 630 to send command messages to the down-hole module 16. The central processing digital block 600 is connected to the PLC-receiver filter control digital block 660 to adjust the frequency response of the PLC receiver 30 as a function of the transmission response of the down-hole module 16.

Figure 14:
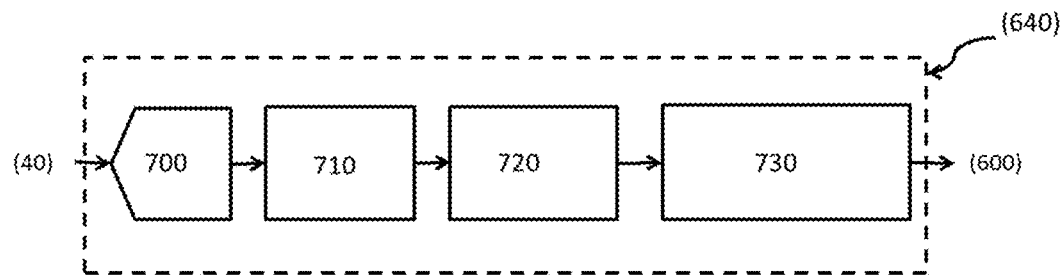
FIG. 14 Surface PLC-receiving digital block. Where 640 is the PLC-receiving digital block, 700 is an analogue-to-digital converter (ADC), 710 is a digital filter block, 720 is a demodulating block, and 730 is a data link and message detection block.

The PLC-transmitting digital block 640 from FIG. 14 is composed of an analogue-to-digital converter (ADC) 700, a digital filter block 710, a demodulating block 720, a data link and message detection block 730. The ADC 700 receives the analog signal coming from the receiving module 40, where the ADC 700 converts such analog signal to a digital representation, which is the input to the digital filter block 710 that limits the band to the reception frequency spectrum, the output of the digital filter 710 is connected to a demodulating block 720, which retrieves the digital frame of the command messages, where the digital frame is transferred to the data link and message detection block 730 that sends the retrieved information to the processing and control block 600.

Figure 15:
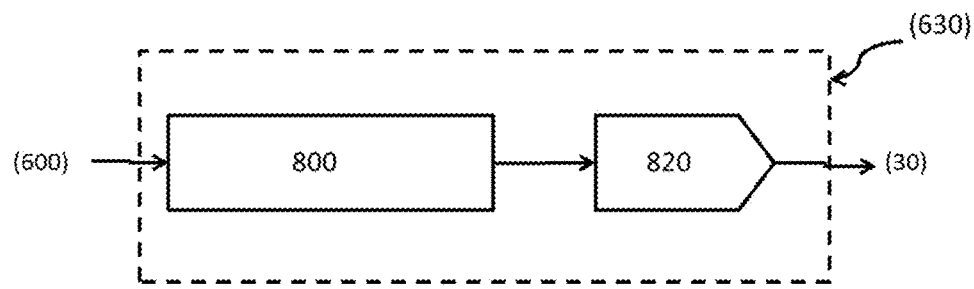
FIG. 15 Surface module PLC-transmitting digital block. Where 630 is the PLC-transmitting digital block, 800 is a message building and segmentation block, and 820 is a signal synthesizer block.

The PLC-transmitting digital block 630 from FIG. 15 is composed of a message building and segmentation block 800, and a signal-synthesizing block based on a DAC 820. The message-building and data segmentation block 800 receives the information coming from the processing and control block 600, encodes and segments the message, whose segments are delivered to the signal-synthesizing module 820, which delivers a transmission-band modulated analog signal to the PLC-transmitting module 30.

Figure 16:
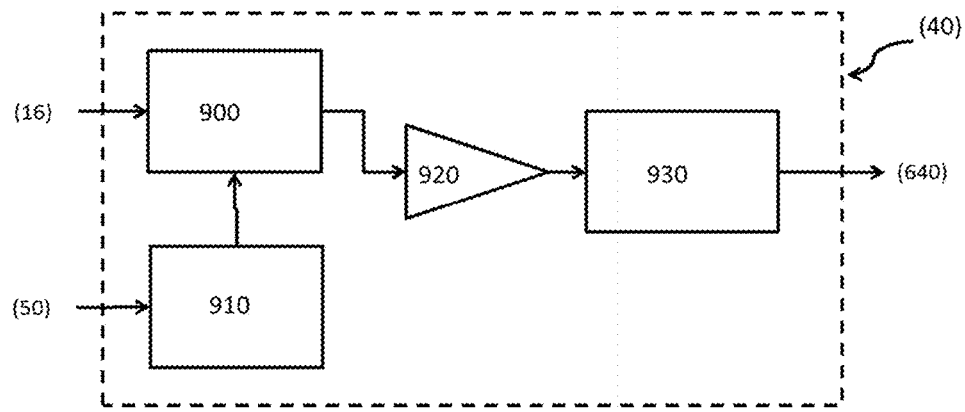
FIG. 16 Surface module PLC-receiving digital block. Where 900 is an adjustable bandpass filter block, 910 is a central frequency control block, 920 is a low-noise amplifier (LNA), and 930 is a signal-conditioning block.

The surface receiving module 40, illustrated in FIG. 16 is composed of an adjustable bandpass filter block 900, a central frequency control block 910, a low-noise amplifier (LNA) 920, and a signal-conditioning block 930. The adjustable bandpass filter block 900 receives the communications signal coming from the down-hole module 16, filters it in frequency according to the frequency adjustment coming from the central frequency control block 910, which receives the frequency adjustment value from the acquisition and control module 50. The adjustable bandpass filter block 900 delivers the processed communication signal to the low-noise amplifier block (LNA) 920, which amplifies the amplitude attenuated signal to the levels required by the signal-conditioning block 930, which scales the signals and couples the output impedance to deliver the communications signal to the PLC-receiving digital module 640.

The invention claimed is:

1. A method for real-time characterization of the attenuation response of a bidirectional communication system using coaxial cable as linking medium in a down-hole intelligent communication system having a surface module and a down-hole module, the method comprising:
   a) sending a characterization command from the surface module to the down-hole module generating from the surface module wide-spectrum test signals in a frequency domain based on a voltage pulse in a time domain capable of generating signals with frequencies in a transmission and reception bands of interest;
   b) acquiring and storing the test signals that travelled along the whole communications medium including filtering modules;
   c) acquiring and storing a background noise signal present at an input of a down-hole receiver;
   d) processing the acquired signals from steps (b) and (c) through a Fast Fourier Transforms (FFTs);
   e) estimating a transmission frequency with the best signal-to-noise ratio from the FFTs obtained from the test signals and the noise signal at the input of the down-hole receiver;
   f) adjusting coefficients associated to a digital filtering block and parameters of a surface demodulator module to adjust the down-hole receiver to a new reception frequency based on the estimated transmission frequency; and
   g) adjusting the parameters of the surface demodulator module for adjusting a transmitter of the down-hole module to a new transmission frequency based on the estimated transmission frequency.

2. The method of claim 1, wherein
   the surface module consists of a data acquisition system based on an equipment with digital signal processing capability;
   the down-hole module consists of a measurement module, based on a digital signal processor and a tractor equipment;
   the data acquisition system of the surface module has the capability of generating, receiving and processing wide spectrum test signals for characterization of the communications medium, which comprises an acquisition and control module, a computer, a PLC transmitter with surface filtering modules and a PLC receiver with surface filtering modules; and
   the measurement module of the down-hole module is based on a digital signal processor that has the capability of generating, receiving and processing wide spectrum test signals for characterization of the communications medium, which comprises a sensing module connected to a control and processing module, linked to a down-hole transmitter with down-hole filtering module, a down-hole receiver with filtering modules, and a down-hole power supply which consists of high voltage reducing source to power supply to the measurement module of the down-hole module.

3. The method of claim 1, wherein the method initiates and operates from the down-hole module towards the surface module.

4. The method of claim 1, wherein the coefficients of the digital filters and the parameters of the surface demodulator module are stored in a nonvolatile memory and correlated with temperature changes.

* * * * *